US008118048B2

(12) United States Patent
Timms et al.

(10) Patent No.: US 8,118,048 B2
(45) Date of Patent: Feb. 21, 2012

(54) APPARATUS AND METHOD FOR FORMING AN OPENING IN A STORAGE TANK

(75) Inventors: Dale Timms, Frankston South (AU);
Philip Quinan, Frankston (AU); Russell Thorpe, Greensborough (AU)

(73) Assignee: Zestco Pty. Ltd., Frankston, Victoria (AU)

( * ) Notice: Subject to any disclaimer, the term of this patent is extended or adjusted under 35 U.S.C. 154(b) by 333 days.

(21) Appl. No.: 12/444,296

(22) PCT Filed: Oct. 4, 2007

(86) PCT No.: PCT/AU2007/001471
§ 371 (c)(1),
(2), (4) Date: Aug. 24, 2009

(87) PCT Pub. No.: WO2008/040055
PCT Pub. Date: Apr. 10, 2008

(65) Prior Publication Data
US 2010/0000611 A1 Jan. 7, 2010

(30) Foreign Application Priority Data

Oct. 4, 2006 (AU) ................................ 2006905492

(51) Int. Cl.
*B23B 41/08* (2006.01)
(52) U.S. Cl. ...................................... 137/15.13; 137/318
(58) Field of Classification Search ................... 137/318, 137/317, 315.01, 15.14, 15.13
See application file for complete search history.

(56) References Cited

U.S. PATENT DOCUMENTS 5,819,815 A * 10/1998 Nickens et al. ............... 137/318
6,648,562 B1 * 11/2003 Calkins et al. ................ 137/318

FOREIGN PATENT DOCUMENTS

| DE | 20005169 U1 | 6/2000 |
| SU | 1121388 A | 10/1984 |
| WO | WO 01/98031 A1 | 12/2001 |

* cited by examiner

*Primary Examiner* — Kevin Lee
(74) *Attorney, Agent, or Firm* — Gerald E. Helget; Briggs and Morgan, P.A.

(57) ABSTRACT

An apparatus and method for forming an opening through a storage tank (3) containing a flammable and/or combustible fluid, for example petrol. The storage tank (3) includes a hollow column (7) extending outwardly from an exterior surface of the storage tank (3), an interior wall of the hollow column (7) in combination with the exterior surface of the storage tank (3) defining a well-like cavity allowing access by the apparatus (1) to the exterior surface of the storage tank (3). The apparatus (1) includes a cutting assembly (13) for cutting through the exterior surface of the storage tank (3); and a housing assembly for supporting the cutting assembly (13). The housing assembly includes a sealing assembly for sealing the housing assembly with respect to the hollow column (7) such that the cavity is sealed from surrounding air. The housing assembly further includes a fluid circulation assembly for passing nitrogen into the cavity such that a non-flammable environment is provided within the cavity during cutting of the opening. The opening is thereby safely cut without generating ignition sources such as sparks and flames. Flammable vapor is also prevented from escaping into the surrounding air. In addition, the storage tank (3) does not need to be emptied of fluid prior to the commencement of the cutting process.

18 Claims, 15 Drawing Sheets

APPARATUS AND METHOD FOR FORMING AN OPENING IN A STORAGE TANK

CROSS REFERENCE TO RELATED APPLICATIONS

The present application is based on and claims priority of International patent application Serial No. PCT/AU2007/001471 filed on Oct. 4, 2007, and Australian Patent Application No. 2006905492 filed on Oct. 4, 2006, the contents of which are hereby incorporated by reference in their entirety.

BACKGROUND OF THE INVENTION

Flammable and/or combustible fluids, for example petrol is usually stored in some form of storage tank. A flammable fluid is a liquid that has a flashpoint below 38° Celsius, for example petrol. The flashpoint is the minimum temperature at which a liquid gives off vapour in sufficient concentration to form an air-vapour mixture that can be ignited. A combustible fluid is a liquid that has a flashpoint above 38° Celsius. Combustible fluids include diesel and kerosene.

At retail fuel outlets, for example service or petrol stations for motor vehicles (referred to in some countries as gas or gasoline stations), one or more storage tanks are usually located underground. The underground storage tanks typically have some form of upstanding access pipe provided which leads from the storage tank to ground level. The upstanding access pipe is closed at ground level by some form of lid. In order to determine the amount of fuel, for example petrol, within the storage tank the lid is opened and a measuring stick inserted. The measuring stick extends to the bottom of the tank with the petrol marking the stick to indicate the depth of the petrol within the tank. The problem in determining the amount of stored petrol in this manner is that it is labour intensive and difficult to obtain an accurate measurement. In addition, it is difficult to readily determine from the measurement taken as to whether the storage tank is leaking as such a determination can not be made without first calculating how much fuel has been pumped from the storage tank by customers since the last measurement was taken. For these reasons, all newly constructed petrol stations install some form of automatic measuring system during the construction.

However, in order to install an automatic measuring system to an existing underground storage tank it is often necessary to firstly install an additional upstanding access pipe leading from the storage tank to ground level. This type of upstanding access pipe can also be required for a variety of other reasons, for example to provide an access point to the storage tank for cleaning purposes.

In the past when an upstanding access pipe, otherwise known as a riser, was required for an existing underground storage tank the installation typically involved cold cutting or drilling a series of holes in an exterior surface of the storage tank. Once a suitably sized opening was formed in the storage tank a riser would then be welded to the exterior surface with the riser extending upwardly to ground level. As the petrol within the storage tank is highly flammable installing a riser in this manner is extremely dangerous as a spark or flame created during the installation process could easily ignite the petrol. For this reason the storage tank has to be emptied prior to the installation of a riser to reduce the risk of an explosion occurring. However, an empty storage tank is still potentially explosive as even the slightest amount of residual petrol within an empty storage tank will result in flammable vapour being released into the surrounding air. Accordingly, degassing and the introduction of an inert gas to the empty storage tank was necessary before installation of the riser could safely commence. The process of installing a riser to a storage tank which contains flammable fluid is therefore complex, time consuming and inconvenient.

Accordingly, it would be desirable to provide an apparatus and method for safely forming an opening in a storage tank containing a flammable and/or combustible fluid without having to firstly remove the fluid from the tank.

Any discussion of documents, devices, acts or knowledge in this specification is included to explain the context of the invention. It should not be taken as an admission that any of the material formed part of the prior art base of the common general knowledge in the relevant art in Australia or any other country on or before the priority date of the claims herein.

SUMMARY OF THE INVENTION

In accordance with a first aspect of the invention there is provided an apparatus for forming an opening through a storage tank containing a flammable and/or combustible fluid. The storage tank has a hollow column extending outwardly from an exterior surface of the storage tank. An interior wall of the hollow column in combination with the exterior surface of the storage tank defines a well-like cavity allowing access by the apparatus to the exterior surface of the storage tank. The apparatus includes a cutting assembly for cutting through the exterior surface of the storage tank. The apparatus further includes a housing assembly for supporting the cutting assembly. The housing assembly includes a sealing assembly for sealing the housing assembly with respect to the hollow column such that the cavity is sealed from surrounding air. The housing assembly further includes a fluid circulation assembly for passing a circulation fluid into the cavity such that a non-flammable environment is provided within the cavity during cutting of the opening.

The circulation assembly preferably includes an inlet duct for circulation fluid. The inlet duct extends through a main body of the housing assembly into the cavity. Preferably, the circulation fluid is nitrogen.

In a preferred embodiment, the cutting assembly includes a cutting head and a cutting shaft. The cutting head is preferably located at a first end of the cutting shaft. The cutting shaft is preferably supported by and extends through guide channels in the main body.

In a particularly preferred embodiment, the housing assembly further includes a shroud extending from a first end of the main body. The cutting head preferably projects from the first end of the main body and the shroud substantially surrounds the cutting head.

In a particularly preferred embodiment, the sealing means a first sealing arrangement and a second sealing arrangement. The first sealing arrangement includes an upper and lower wedge member. The upper wedge member may be attached around a circumference of the main body. The lower wedge member may extend around a circumference of the upper wedge member. A bottom edge of the lower wedge member is preferably supported on a top edge of the shroud.

Preferably, the second sealing arrangement includes a positioning collar and a locking collar. The positioning collar is locatable around the main body and is fastenable on an upper end of the hollow column. Preferably, the locking collar extends around the circumference of the main body and is fastenable on the positioning collar, thereby securing the second sealing arrangement of the apparatus to the upper end of the hollow column. Further, when the locking collar is fastened onto the positioning collar, the lower wedge is preferably forced radially outwards into sealing engagement with the interior wall of the hollow column, so that the cavity is sealed from surrounding air. The circulation fluid can then be passed into the cavity such that a non-flammable environment is provided within the cavity. The cutting head can then cut an opening in the exterior surface of the storage tank without the risk of the fluid within the storage tank igniting.

According to a further aspect of the invention, there is provided a method of forming an opening through a storage tank containing a flammable and/or combustible fluid. The storage tank has a column extending outwardly from an exterior surface of the storage tank. An interior wall of the hollow column in combination with the exterior surface of the storage tank defines a well-like cavity. The method including the steps of:

inserting an apparatus in accordance with the first aspect of the invention, into the cavity;

sealing the apparatus with respect to the interior wall of the hollow column such that the cavity is sealed from surrounding air;

providing circulation fluid into the cavity so as to create a non-flammable environment; and cutting an opening in the exterior surface of the storage tank.

According to another aspect of the invention, there is provided a method of forming an opening through a storage tank containing a flammable and/or combustible fluid. The method including the steps of:

attaching a hollow column to an exterior surface of the storage tank such that an interior wall of the hollow column in combination with the exterior surface of the storage tank define a well-like cavity;

inserting an apparatus in accordance with the first aspect of the invention into the cavity;

sealing the apparatus with respect to the interior wall of the hollow column such that the cavity is sealed from surrounding air;

providing circulation fluid into the cavity so as to create a non-flammable environment; and cutting an opening in the exterior surface of the storage tank.

According to yet another aspect of the invention, there is provided a system for forming an opening through a storage tank containing a flammable and/or combustible fluid. The system includes a hollow column for attaching to an exterior surface of the storage tank such that an interior wall of the hollow column in combination with the exterior surface of the storage tank define a well-like cavity. The system further includes an apparatus in accordance with the first aspect of the invention for cutting the opening within the well-like cavity; and a support stand for supporting the apparatus during the cutting of the opening.

BRIEF DESCRIPTION OF THE DRAWINGS

A preferred embodiment of the invention will now be described. The preferred embodiment should not be considered as limiting any of the statements in the previous section. The preferred embodiment will be described with reference to the following figures in which.

DESCRIPTION OF PREFERRED EMBODIMENT

Figure 13:
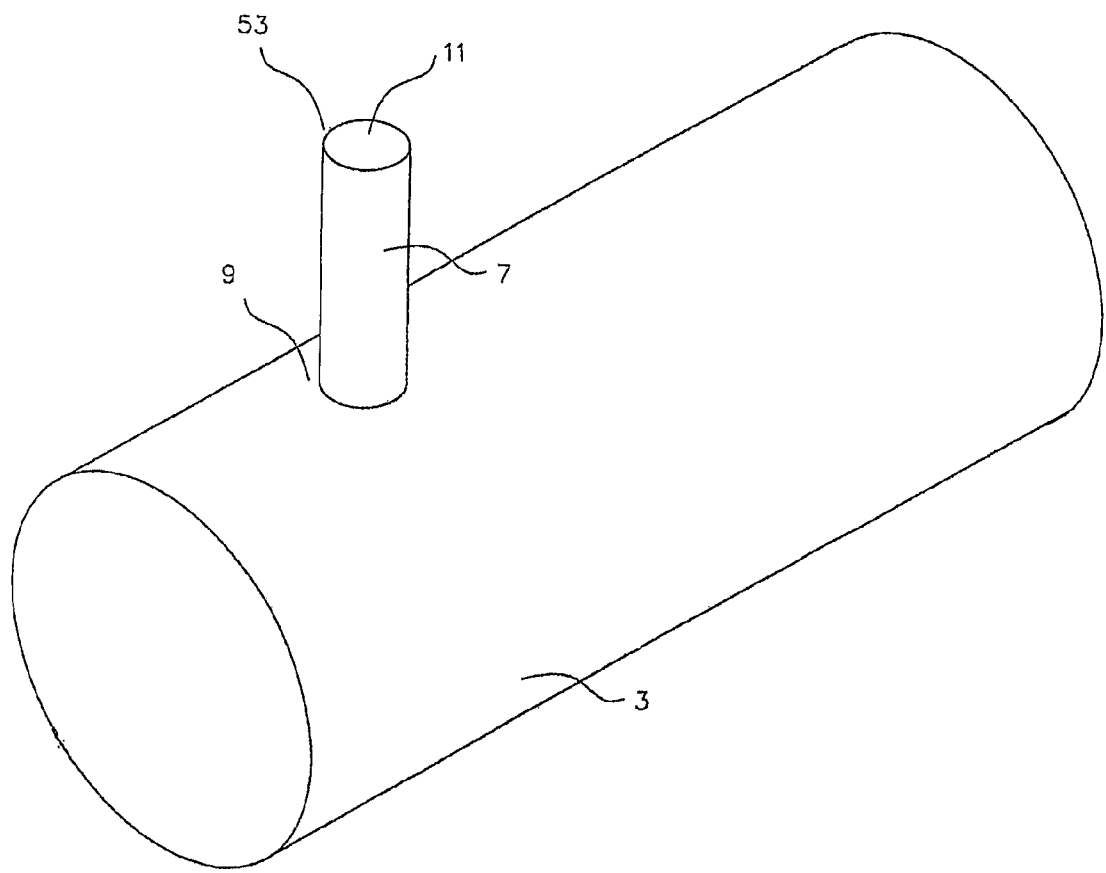
FIG. 13 is a side perspective view of a storage tank having a hollow column extending outwardly from an exterior surface of the storage tank.

Referring initially to FIG. 13, the apparatus 1 according to the present invention is applicable for forming an opening through a storage tank 3 containing a flammable and/or combustible fluid, for example petrol. The storage tank 3 has a hollow column, which is otherwise known as a riser 7, extending outwardly from an exterior surface 9 of the storage tank 3. An interior wall 11 of the riser 7 in combination with the exterior surface 9 of the storage tank 3 define a well-like cavity allowing access by the apparatus 1 to the exterior surface 9 of the storage tank 3.

Referring now to FIGS. 1 to 7, the apparatus 1 includes a cutting assembly 13 and a housing assembly for supporting the cutting assembly 13. As can be best seen in FIG. 6, the cutting assembly 13 includes a cutting shaft 15 and a cutting head 17 at a first end of the cutting shaft 15. The housing assembly includes a main body 19. The main body 19 includes a cylindrical outer shell, an upper end cap 5 and a lower end cap 20. At a first end of the main body 19 the lower end cap 20 is attached to one end of the cylindrical outer shell. At a second end of the main body 19 the upper end cap 5 is attached to an opposing end of the cylindrical outer shell. The upper and lower end caps 5, 20 each have a longitudinal guide channel extending therethrough. The cutting shaft 15 of the cutting assembly 13 is supported by and extends through the guide channels.

The housing assembly further includes a sealing assembly for sealing the cylindrical outer shell of the main body 19 with respect to the riser 7 such that surrounding air is not able to enter the well-like cavity when the apparatus 1 is secured to the riser 7. The sealing assembly includes a first sealing arrangement and a second sealing arrangement. The first sealing arrangement is located near the first end of the main body 19 and includes an upper wedge member 23 and a lower wedge member 25. The upper wedge member 23 is securely fixed around a circumference of the cylindrical outer shell of the main body 19. The lower wedge member 25 extends around a circumference of the upper wedge member 23 and is movable with respect to the upper wedge member 23. When the apparatus 1 is located in the riser 7, the lower wedge member 25 engages with the interior wall 11 of the riser 7. The lower wedge member 25 is provided with an O-ring 63 to seal the wedge member 25 with respect to the riser 7. The second sealing arrangement includes a positioning collar 47 and a locking collar 49. The positioning collar 47 includes an annular recess 51 into which an upper edge 53 of the riser 7 is located, such that the positioning collar 47 is seated on the riser 7. An O-ring 65 is provided within the annular recess 51 to enable the sealing of the positioning collar 47 with respect to the riser 7. The positioning collar 47 extends around the circumference of the main body 19 and includes a threaded section 55 onto which the locking collar 49 is locatable. In this regard, the locking collar 49 is provided with a corresponding internal threaded section 57 to enable the locking collar 49 to be threaded onto the positioning collar 47 thereby locking the apparatus 1 onto position on the riser 7. The locking collar 49 is also provided with an O-ring 67 to enable the sealing of the locking collar 46 with respect to the cylindrical outer shell of the main body 19.

The housing assembly further includes a circulation assembly for passing a circulation fluid into the cavity, preferably after the cavity has been sealed from the surrounding air by the sealing assembly. The circulation assembly includes an inlet/outlet collar 22 having an inlet connector 31 and an outlet connector 37. The inlet/outlet collar 22 is positionable around the cylindrical outer shell of the main body 1 such that the inlet connector 31 and the outlet connector 37 each align with corresponding aperture in the outer shell. The circulation assembly further includes an inlet duct 27 within an internal area of the main body 19 of the housing assembly. The aperture in the outer shell which aligns with the inlet connector 31 is connected to one end of the inlet duct 27. The inlet connector 31 is operably connected to a supply source of circulation fluid, which is preferably nitrogen or some other inert gas, such that fluid is thereby supplied through the inlet duct 27. An opposing end 33 of the inlet duct 27 extends through the bottom end cap 20 to thereby enable the circulation fluid to be fed close to the cutting head 17. The bottom end cap 20 further includes an outlet aperture 35 through which the circulation fluid can be returned back into the internal area of the main body 19 and subsequently pass out though the outlet connector 37.

Figure 1:
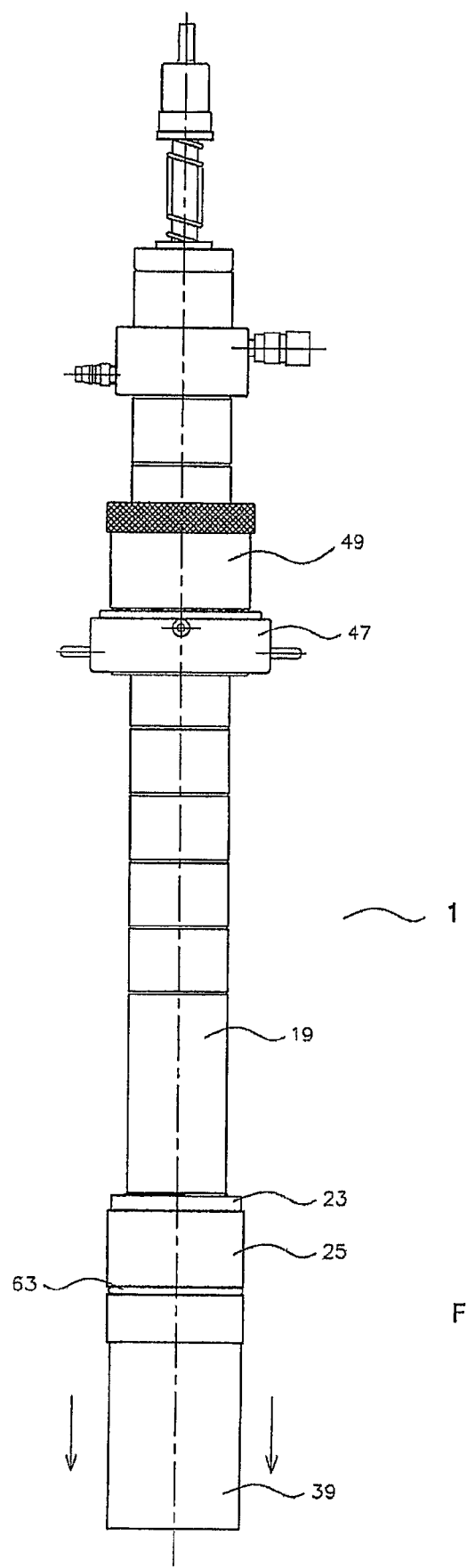
FIG. 1 is a front view of the apparatus according to an embodiment of the invention with the cutting assembly in a retracted position.
Figure 2:
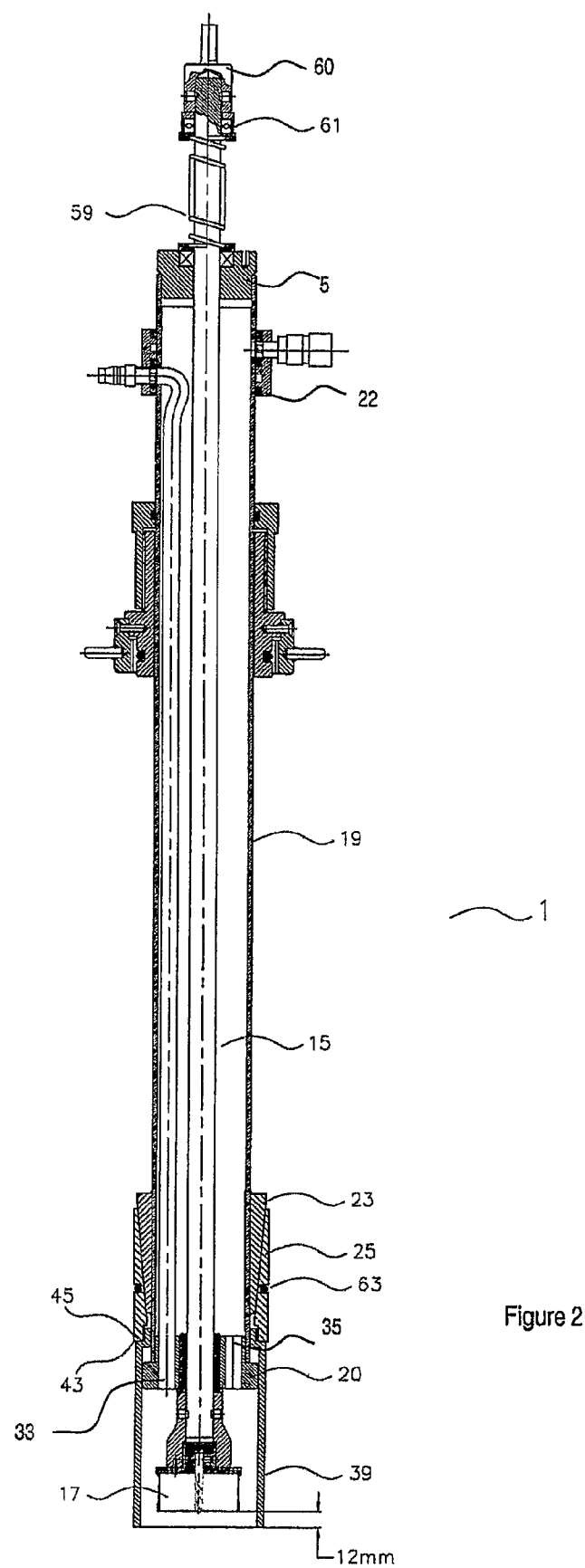
FIG. 2 is a cross-sectional view of the apparatus shown in FIG. 1 illustrating the cutting assembly in the retracted position.
Figure 3:
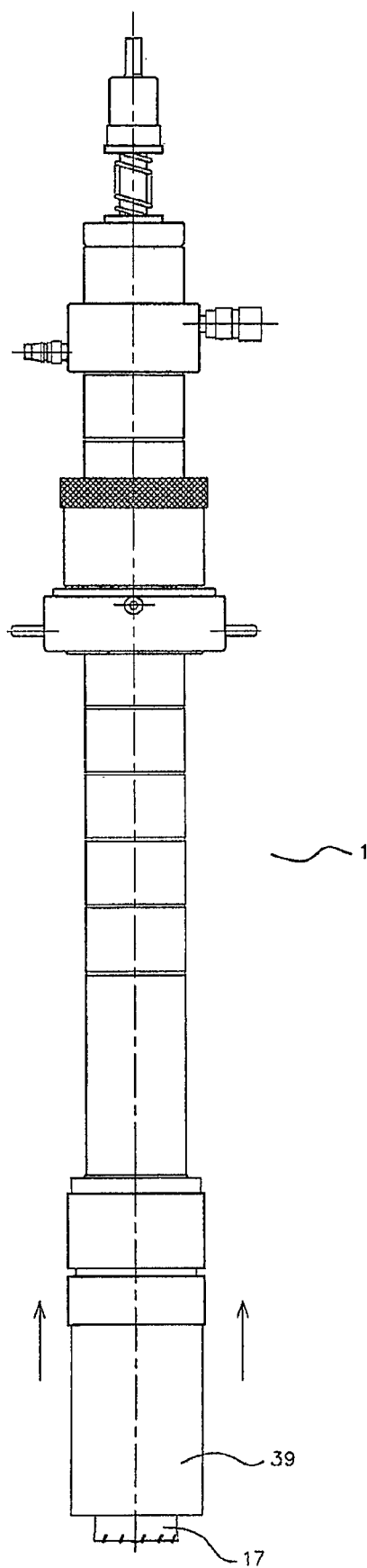
FIG. 3 is a front view of the apparatus shown in FIG. 1, illustrating the cutting assembly in an extended (cutting) position.

The housing assembly further includes a shroud 39 which projects from the first end of the main body 19. The shroud 39 substantially surrounds and lies adjacent to the cutting head 17. The shroud 39 has a ledge at one end which is retained behind a projecting rim 26 of the bottom end cap 20 of the main body 19. At an opposing end of the shroud 39 a bottom edge 41 of the shroud 39 rests against the exterior surface 9 of the storage tank 3 when the cutting assembly 13 is in a retracted position, as shown in FIG. 2. Although the ledge retains the shroud 39 to the main body 19 the shroud 39 is still able to slide a short distance with respect to the main body 19 between the projecting rim 26 and the upper wedge member 23. The ledge of the shroud 39 has a top edge 43 which can abut with a bottom edge 45 of the lower wedge member 25.

Figure 4:
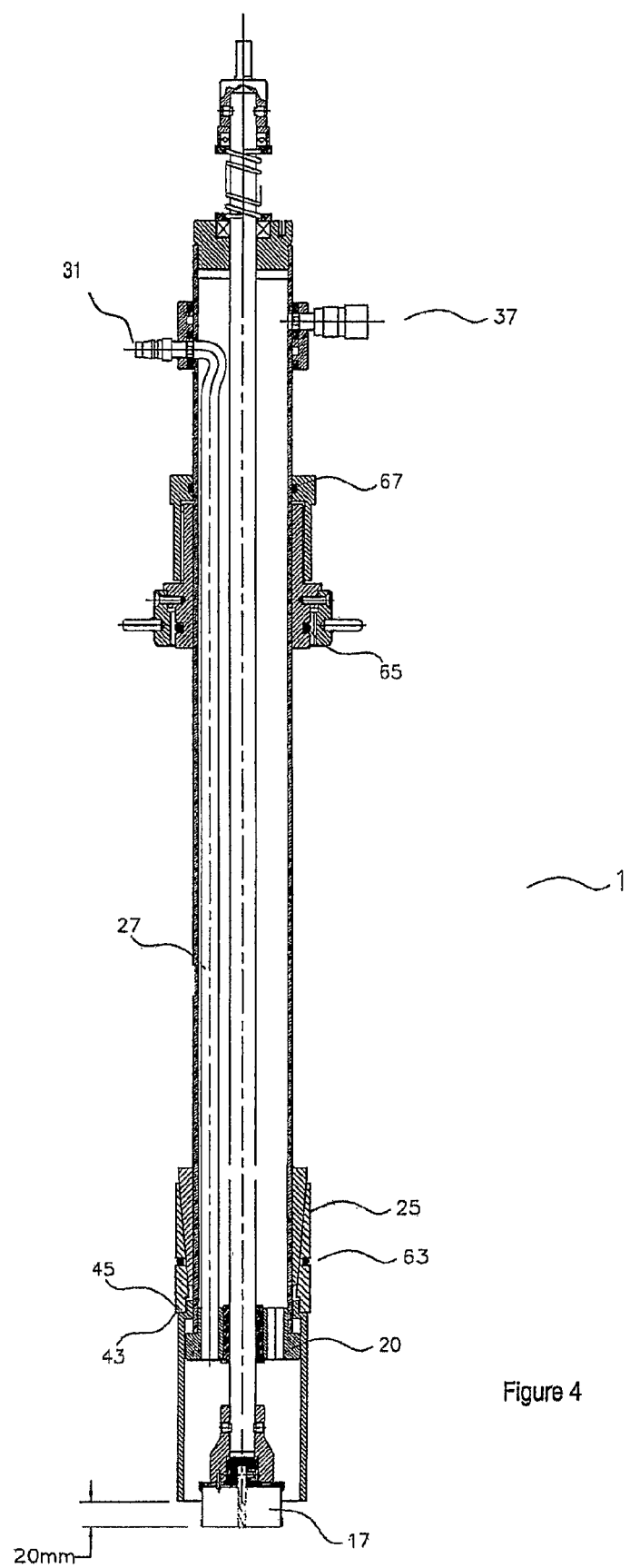
FIG. 4 is a cross-sectional view of the apparatus illustrated in FIG. 1, showing the cutting assembly in the extended (cutting) position.
Figure 5:
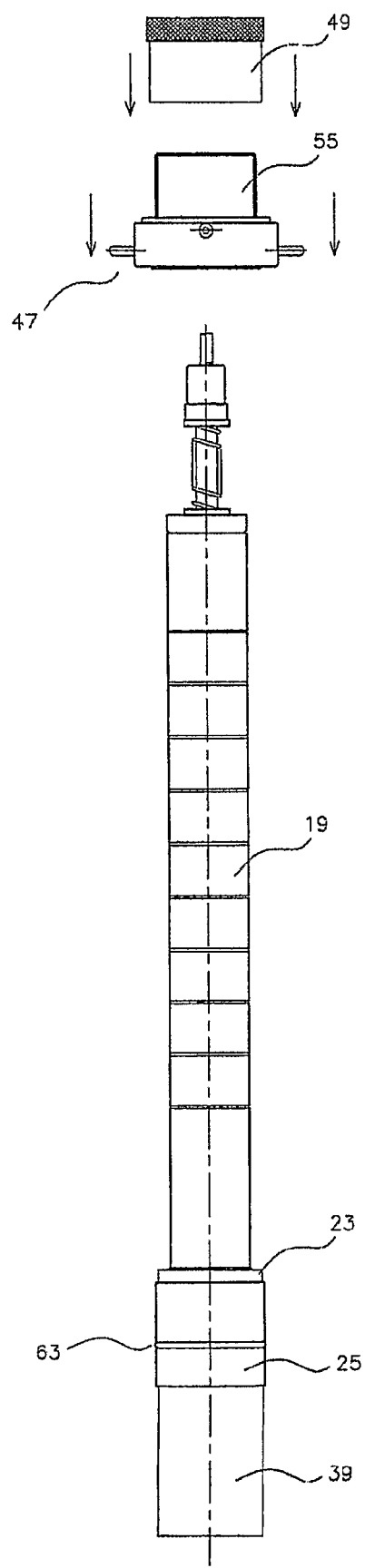
FIG. 5 is an exploded view of the apparatus shown in FIG. 1 illustrating the locking and positioning collars separated from the main body of the housing assembly.

The cutting head 17 of the cutting assembly 13 is movable between a retracted position, as shown in FIG. 2 and an extended or cutting position as shown in FIG. 4. In the retracted position, the cutting head 17 is set back approximately 12 mm from the bottom edge 41 of the shroud 39. In the cutting position, the cutting head extends from the bottom edge 41 of the shroud 39 by approximately 20 mm. Accordingly, the total travel of the cutting shaft 15 is approximately 32 mm. The cutting assembly 13 further includes a spring 59, a retaining collar 60 and a thrust washer 61. The thrust washer 61 is housed within the retaining collar 60. The retaining collar 60 is fastened to the second end of the cutting shaft 15. The cutting head 17 is biased to the retracted position by the spring 59 which is located around the cutting shaft 15. In this regard, the spring 59 extends between the upper end cap 5 of the main body 19 and the retaining collar 60.

Prior to forming an opening through the storage tank 3 it is first necessary to mount the riser 7 onto the exterior surface 9 of the storage tank 3. In this regard, if the storage tank 3 is located underground, it is first necessary to excavate the region above the storage tank 3. Once at least an upper section of the storage tank 3 is exposed, the riser 7 is chemically bonded, rather than welded, to the exterior surface 9 of the storage tank. After the riser 7 is securely bonded to the exterior surface 9 of the storage tank 3 the riser 7 is filled to the upper edge 53 of the riser 7 with water. If no leaks are present the level of the water within the riser 7 should remain constant. Once it has been determined that no leaks are evident the excavated region above the storage tank 3 is then backfilled such that only the upper edge 53 of the riser 7 is left exposed. An end cap may then be located over the upper edge 53 of the riser 7 for access at a later date when an opening in the exterior surface 9 of the storage tank 3 is required.

When an opening in the exterior surface 9 of the storage tank 3 is required, for example to provide access to the storage tank 3 for the installation of third-party equipment, electronic tank gauging equipment, tank maintenance operations or the like, the end cap over the riser 7 is firstly removed. Provided that there are no leaks where the exterior surface 9 of the storage tank 3 is bonded to the riser 7, the level of water within the riser 7 should not have altered from when the riser 7 was initially attached to the storage tank 3. If the storage tank 3 is partially or completely full of fluid, prior to the commencement of the cutting process, the composition of the atmosphere within the storage tank 3 should be checked to ensure that oxygen levels are below 10%. If oxygen levels are greater than this amount, an inert gas such as nitrogen should be placed into the storage tank 3.

The process of cutting an opening in the exterior surface 9 of the storage tank 3 commences with the insertion of the apparatus 1 into the riser 7. In this regard, the apparatus 1 is lowered into the riser 7 until the bottom edge 41 of the shroud 39 touches the exterior surface 9 of the storage tank 3. The riser 7 is approximately 100 mm in diameter and the apparatus 1 is more than 80 mm in diameter. Accordingly, as the riser 7 is initially full of water a substantial amount of the water is displaced from the riser 7 as the apparatus 1 is lowered into the riser 7.

Once the apparatus 1 has been lowered into the riser 7 the positioning collar 47 is secured onto the upper edge 53 of the riser 7. As the locking collar 49 is threaded onto the positioning collar 47, the main body 19 is forced downwards towards the exterior surface 9 of the storage tank 3. This causes an inclined surface of the upper wedge member 23 to slide against a corresponding inclined surface of the lower wedge member 25. As the bottom edge 45 of the lower wedge member 25 rests on the top edge 43 of the shroud 39, when the main body 19 is pushed downwards towards the storage tank 3, the upper wedge member 23 forces the lower wedge member 25 radially outwards towards the interior wall 11 of the riser 7. As a result, the O-ring 63 on the lower wedge member 25 enables the lower wedge member 25 to be sealingly engaged with the interior wall 11 of the riser 7. Once the locking collar 49 has been fully threaded onto the positioning collar 47 and tightened, sealing of the apparatus 1 is complete. Fluid can then only enter the cavity under controlled conditions via the inlet duct 27.

Figure 12:
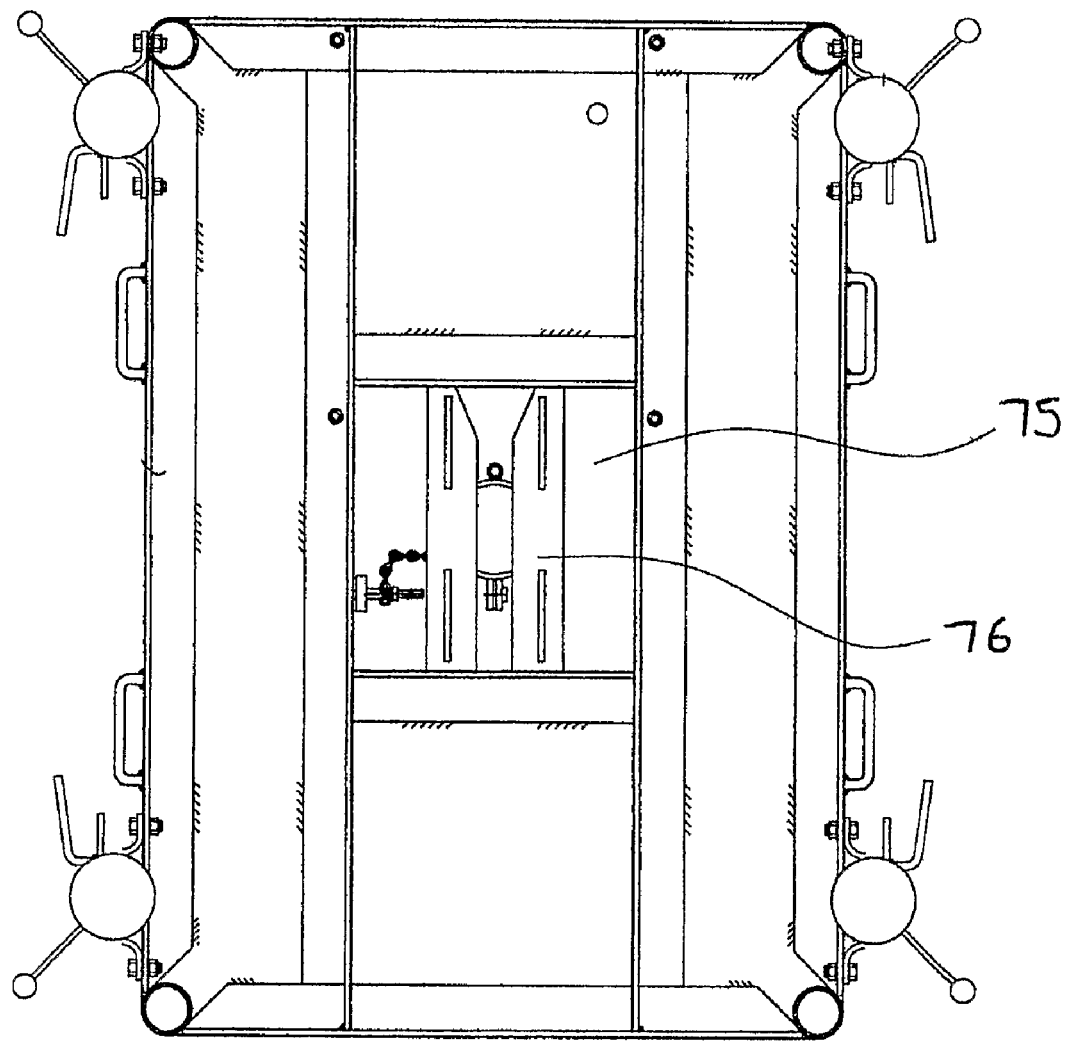
FIG. 12 is a bottom view of the support stand illustrated in FIG. 8.

Following the sealing of the apparatus 1 to the riser 7 a support stand 69, as illustrated in FIGS. 8 to 12, is positioned over the apparatus 1. The support stand 67 includes vertically adjustable legs 71 which support a platform 73. The platform 73 has an access port 75 through which the apparatus 1 extends. As can be seen in FIG. 12, two opposing clamp members 76 are provided over the access port 75. The clamp members 76 are able to move towards one another to thereby securely hold the main body 19 of the apparatus 1.

Figure 6:
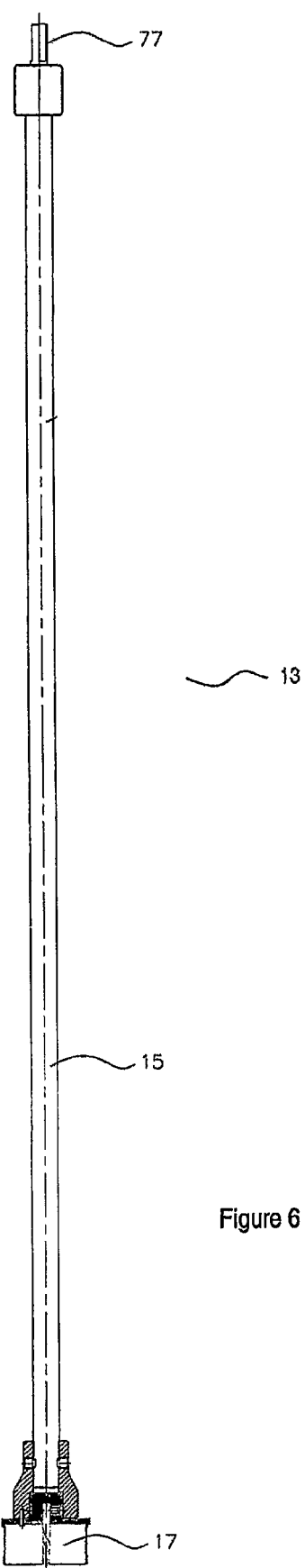
FIG. 6 is a front view of the cutting assembly of the apparatus illustrated in FIG. 1.
Figure 7A:
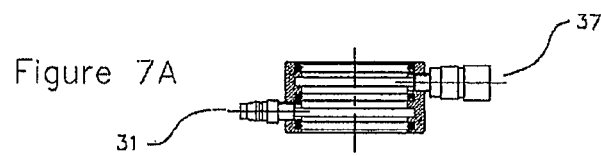
FIGS. 7a to 7f are cross-sectional views of the inlet/outlet collar, locking collar, positioning collar, upper wedge member, lower wedge member, and shroud, respectively of the apparatus illustrated in FIG. 2.
Figure 7B:
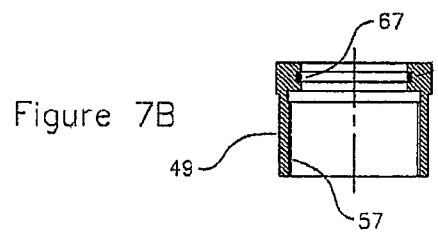
Figure 7C:
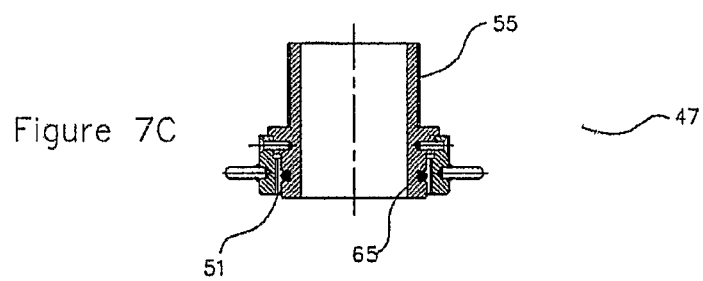
Figure 7D:
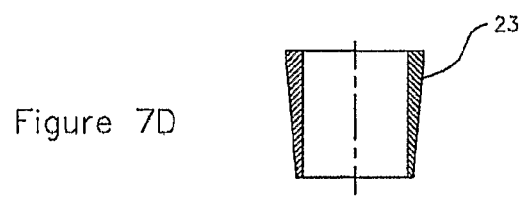
Figure 7E:
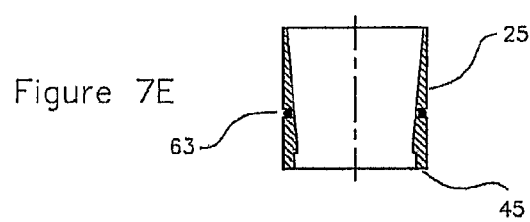
Figure 7F:
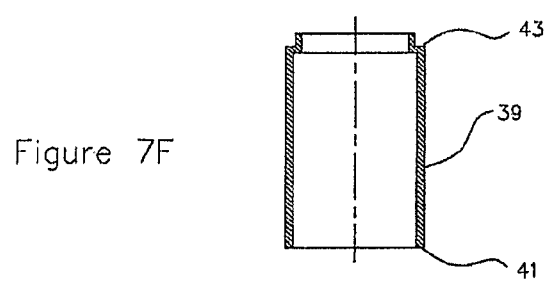
Figure 8:
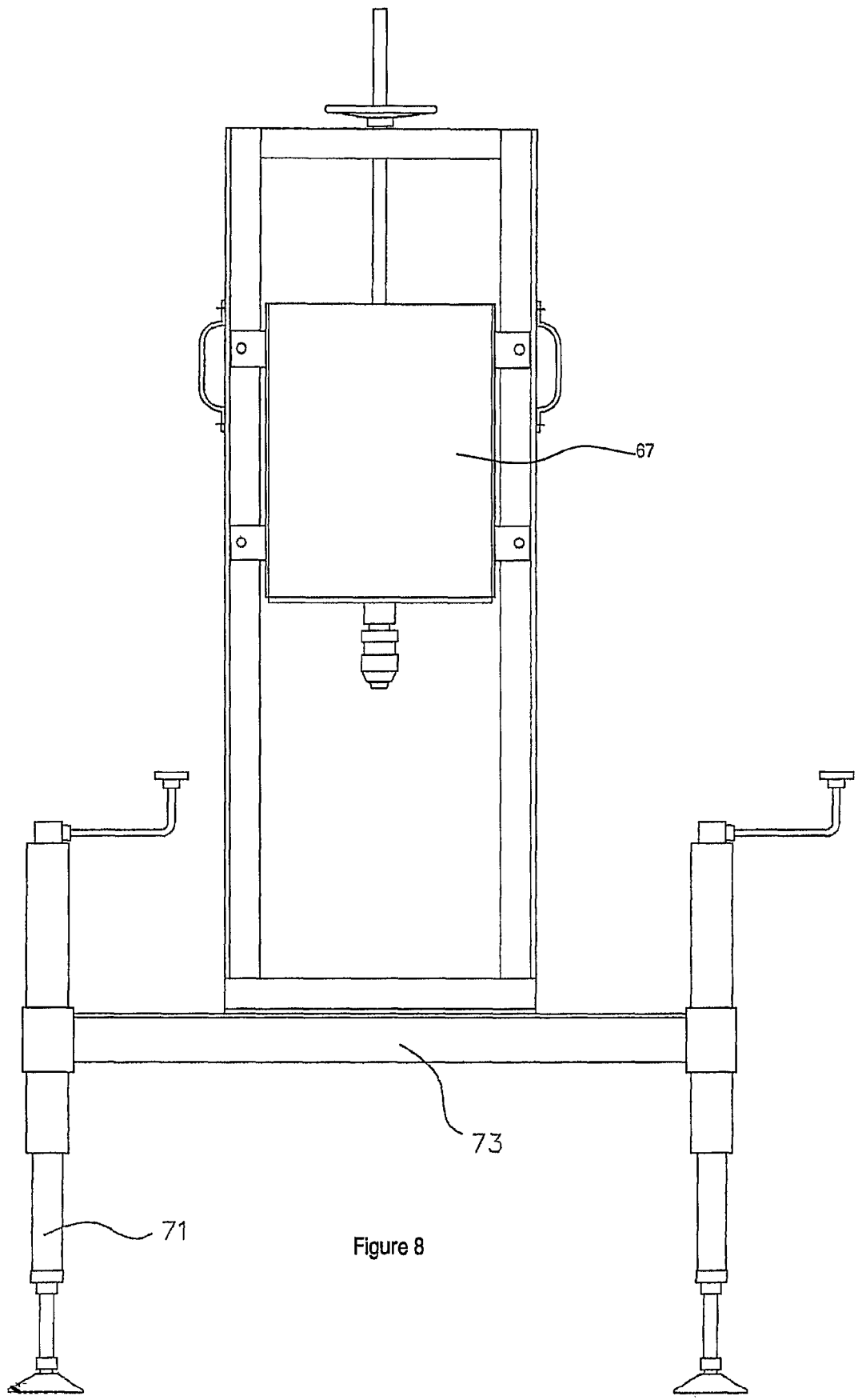
FIG. 8 is a front view of a support stand for the apparatus illustrated in FIG. 1.
Figure 9:
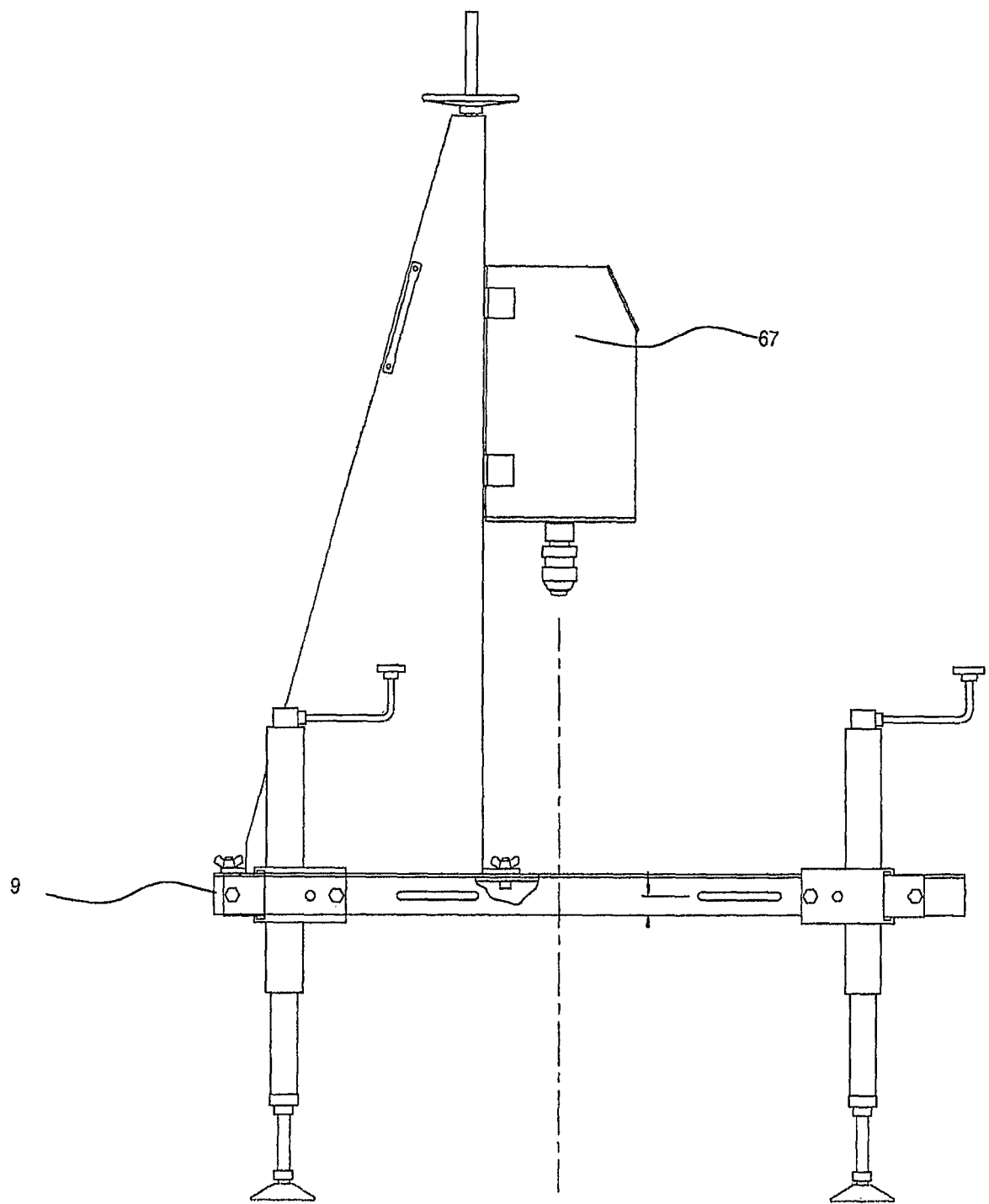
FIG. 9 is a side view of the support stand illustrated in FIG. 8.
Figure 9A:
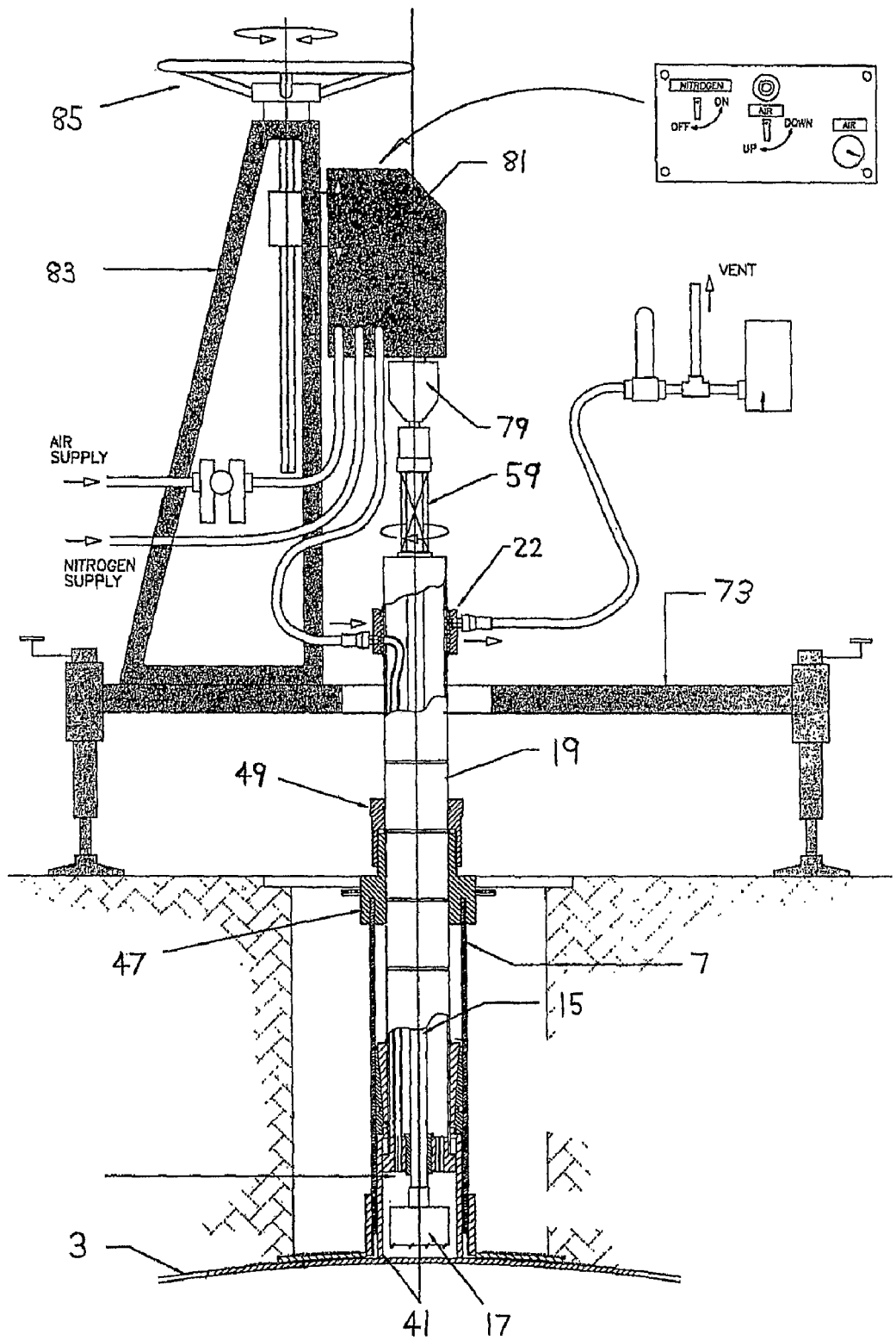
FIG. 9a is a side view of the support stand illustrated in FIG. 8 with the apparatus illustrated in FIG. 1 attached thereto and secured in a hollow column attached to a storage tank.
Figure 9B:
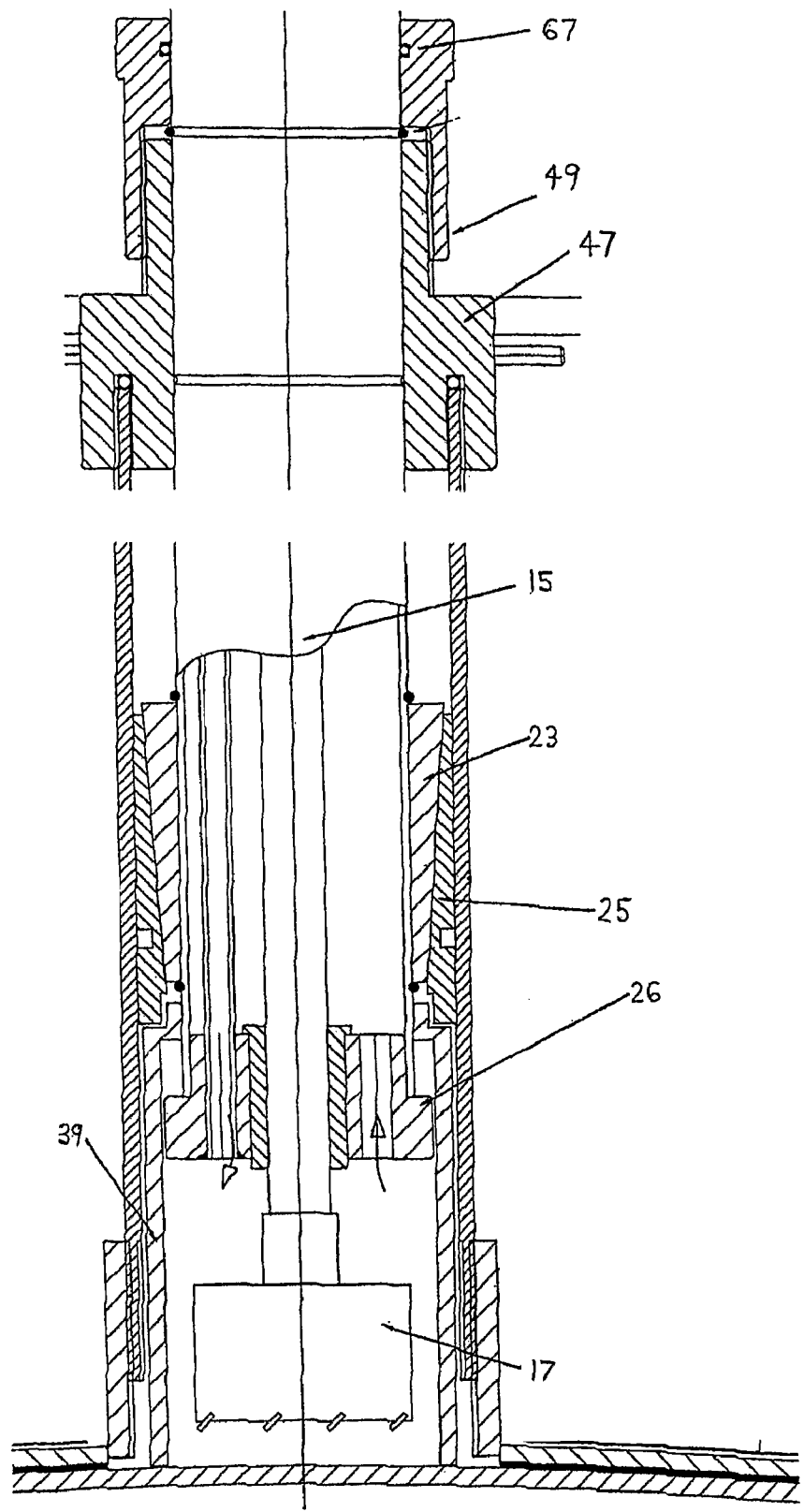
FIG. 9b is magnified view of a portion of FIG. 9a showing the apparatus secured in the hollow column.
Figure 10:
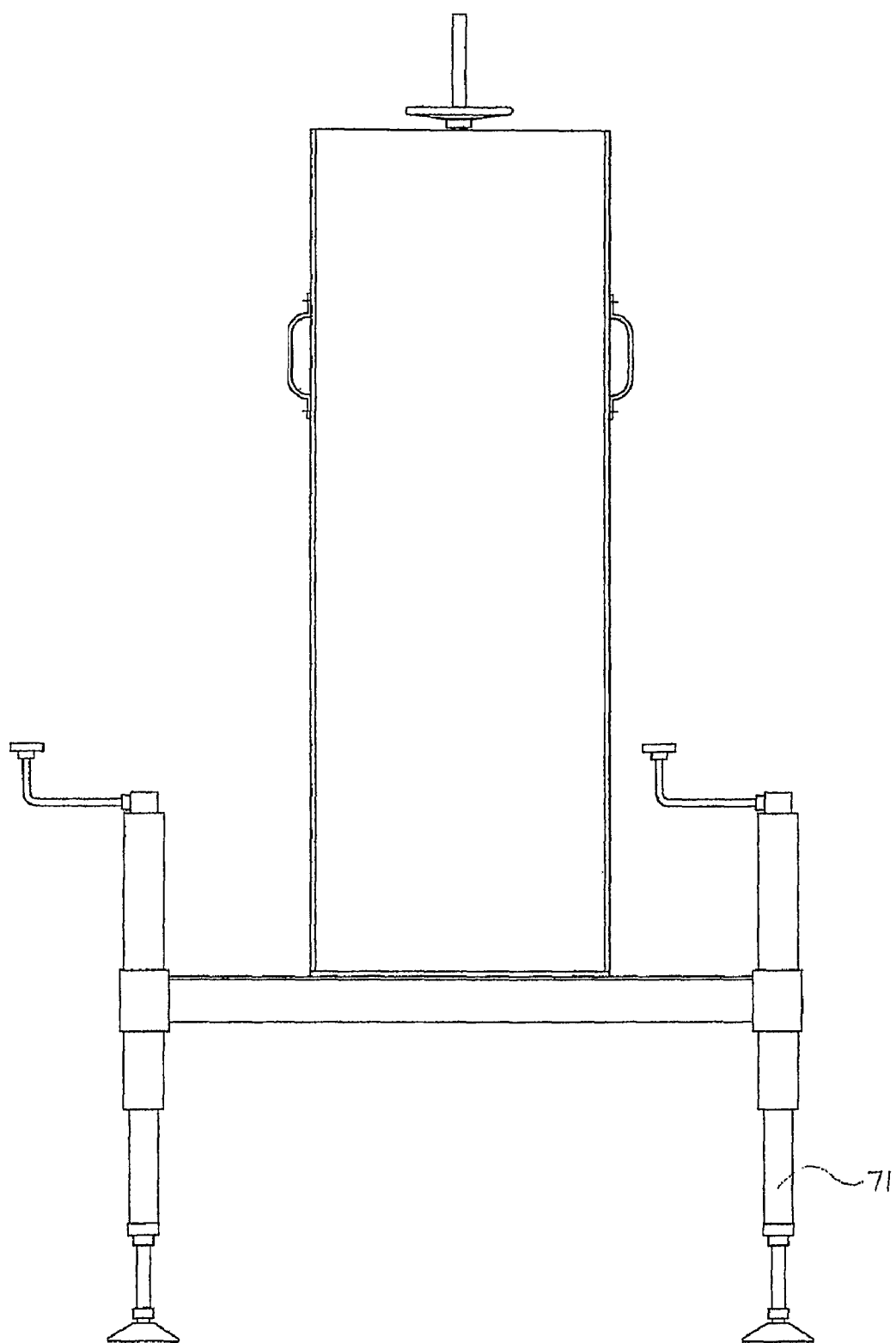
FIG. 10 is a rear view of the support stand illustrated in FIG. 8.
Figure 11:
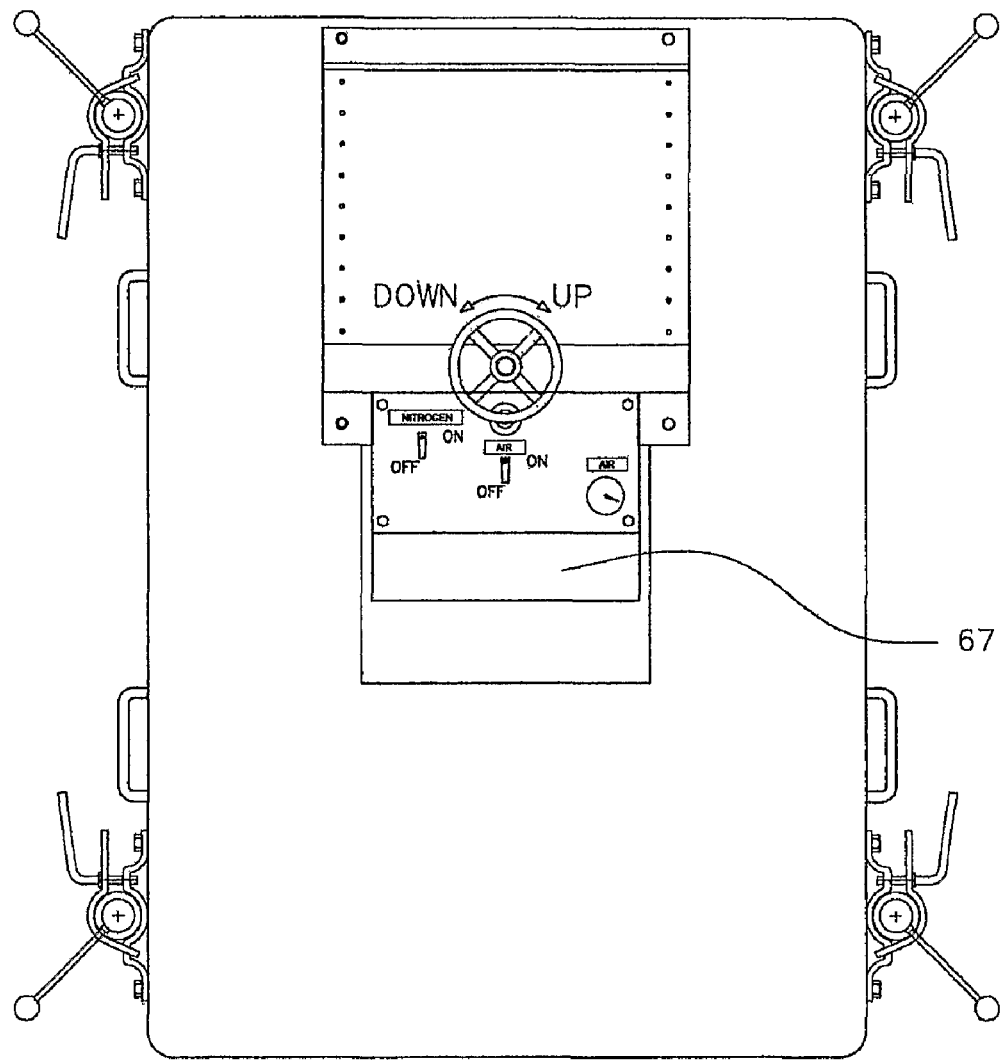
FIG. 11 is a top view of the support stand illustrated in FIG. 8.

With reference to FIGS. 6 and 9a, the cutting shaft 15 is operably rotated by an air drill attached to a drill shaft 77 formed in one end of the retaining collar 60. The drill shaft 77 is triangular in cross section and is inserted into a drill chuck 79 of the air drill. The air drill is controlled via the control box 81 of the support stand 69. The control box 81 is mounted to an A-frame 83 via a vertical guide rail. An upper end of the guide rail is provided with a control wheel 85 which can be rotated to rotate the vertical guide rail such that in-turn the vertical position of the control box 81 and drill chuck 79, with respect to the platform 73, is altered. An air supply source (not illustrated) is operably connected to the air drill.

A fluid inlet feed line is operably connected to a nitrogen supply source (not illustrated) and the inlet connector 31 of the inlet/outlet collar 22 with the flow of nitrogen being controlled via the control panel on the control box 81. A fluid outlet feed line is connected to the outlet connector 37 of the inlet/outlet collar 22. The outlet feed line leads to a nitrogen flow indicator, gas detector and vent.

Nitrogen is fed from the nitrogen supply source into the apparatus 1 with an associated regulator set to 30 kpa. When a pressure monitoring gauge confirms a pressure of 30 kpa a sample can be taken by connecting a gas monitor to an appropriate port to determine whether all oxygen has been depleted from the sealed section of the cavity. When it is established that no oxygen is present in the cavity a non-flammable environment is obtained within the cavity and cutting of the opening in the storage tank 3 can safely commence.

A trigger of the air drill is then locked open, to provide full air pressure, and an appropriate drill speed is selected. The vertical drilling force applied by the air drill is controlled by an operator using a nominated trigger on the air drill. When the nominated trigger is activated variable vertical force is applied to the cutting shaft 17 of the cutting head 15. The vertical position of the cutting head 15 can also be controlled by the user rotating the control wheel 85. When the cutting head 17 has cut through the exterior surface 9 of the storage tank 3 the rotational speed of the cutting head 17 will increase. The cutting head 17 is provided with magnets which retain the off-cut section of the storage tank 3 preventing it and swarf from falling into the storage tank 3.

The supply of compressed air to the air drill is then turned off such that the air drill stops rotating. The drill chuck 79 is then released from the drill shaft 77 and the air drill removed from the platform 73. The nitrogen supply source is then operably disconnected from the inlet connector 31 of the apparatus 1. The support stand 67 is then removed from on top of the storage tank 3. Following removal of the support stand 67 the locking collar 49 is released from the positioning collar 47 such that the apparatus 1 can be withdrawn from the riser 7. The upper edge 53 of the riser 7 can then be fitted with a sealing cap.

The present invention advantageously enables an opening in a storage tank 3 containing a flammable and/or combustible fluid to be safely cut without generating ignition sources such as sparks and flames. Further, the present invention advantageously does not require the immediate area to be cleared of personnel during the cutting process as flammable vapour is prevented from escaping into the surrounding air. In addition, the present invention does not require the storage tank 3 to be emptied of flammable fluid prior to the commencement of the cutting process.

As the present invention may be embodied in several forms without departing from the essential characteristics of the invention, it should be understood that the above described embodiment should not be considered to limit the present invention but rather should be construed broadly within the spirit and scope of the invention. Various modifications and equivalent arrangements are intended to be included within the spirit and scope of the invention.

The invention claimed is:

1. An apparatus for forming an opening through a storage tank containing a flammable and/or combustible fluid, the storage tank having a hollow column extending outwardly from an exterior surface of the storage tank, an interior wall of the hollow column in combination with the exterior surface of the storage tank defining a well-like cavity allowing access by the apparatus to the exterior surface of the storage tank, the apparatus including:
    (a) a cutting assembly for cutting through the exterior surface of the storage tank; and
    (b) a housing assembly for supporting the cutting assembly, the housing assembly including a sealing assembly for sealing the housing assembly with respect to the hollow column such that the cavity is sealed from surrounding air,
        wherein the housing assembly further includes a fluid circulation assembly for passing a circulation fluid into the cavity such that a non-flammable environment is provided within the cavity during cutting of the opening.

2. The apparatus of claim 1, wherein the housing assembly further includes a main body and a shroud extending from a first end of the main body.

3. The apparatus of claim 1, wherein the sealing assembly includes a first sealing arrangement and a second sealing arrangement.

4. The apparatus of claim 3, wherein the first sealing arrangement includes an upper and lower wedge member.

5. The apparatus of claim 4, wherein the upper wedge member is attached around a main body of the housing assembly.

6. The apparatus of claim 5, wherein the lower wedge member extends around the upper wedge member.

7. The apparatus of claim 2, wherein a bottom edge of a wedge member is supportable on a top edge of the shroud.

8. The apparatus of claim 7, wherein the sealing assembly includes a positioning collar and a locking collar, the positioning collar being locatable around the main body and fastenable on an upper end of the hollow column.

9. The apparatus of claim 8, wherein the locking collar extends around the main body and is fastenable on the positioning collar.

10. The apparatus of claim 9, wherein the wedge member is forced radially outwards into engagement with the interior wall of the hollow column when the locking collar is fastened onto the positioning collar.

11. The apparatus of claim 1, wherein the cutting assembly includes a cutting head and a cutting shaft, the cutting head being at a first end of the cutting shaft.

12. The apparatus of claim 11, wherein the cutting shaft is supported by and extends through guide channels in a main body of the housing assembly.

13. The apparatus of claim 12, wherein the cutting head projects from a first end of the main body, and a shroud substantially surrounds the cutting head.

14. The apparatus of claim 1, wherein the circulation assembly includes an inlet duct for circulation fluid, the inlet duct extending through a main body of the housing assembly into the cavity.

15. The apparatus of claim 1, wherein the circulation fluid is nitrogen.

16. A method of forming an opening through a storage tank containing a flammable and/or combustible fluid, the storage tank having a hollow column extending outwardly from an exterior surface of the storage tank, an interior wall of the hollow column in combination with the exterior surface of the storage tank defining a well-like cavity, the method including the steps of:
  (a) inserting the apparatus of claim 1 into the cavity;
  (b) sealing the apparatus with respect to the interior wall of the hollow column such that the cavity is sealed from surrounding air;
  (c) providing circulation fluid into the cavity so as to create a non-flammable environment; and
  (d) cutting an opening in the exterior surface of the storage tank.

17. A method of forming an opening through a storage tank containing a flammable and/or combustible fluid, the method including the steps of:
  (a) attaching a hollow column to an exterior surface of the storage tank such that an interior wall of the hollow column in combination with the exterior surface of the storage tank define a well-like cavity;
  (b) inserting the apparatus of claim 1 into the cavity;
  (c) sealing the apparatus with respect to the interior wall of the hollow column such that the cavity is sealed from surrounding air;
  (d) providing circulation fluid into the cavity so as to create a non-flammable environment; and
  (e) cutting an opening in the exterior surface of the storage tank.

18. A system for forming an opening through a storage tank containing a flammable and/or combustible fluid, the system including:
  (a) a hollow column for attaching to an exterior surface of the storage tank such that an interior wall of the hollow column in combination with the exterior surface of the storage tank define a well-like cavity;
  (b) the apparatus of claim 1 for cutting the opening within the well-like cavity; and
  (c) a support stand for supporting the apparatus during the cutting of the opening.

* * * * *